UNITED STATES PATENT OFFICE.

WILLIAM C. ARSEM, OF SCHENECTADY, NEW YORK, ASSIGNOR TO GENERAL ELECTRIC COMPANY, A CORPORATION OF NEW YORK.

GRAPHITE CONDUCTOR.

1,091,616.     Specification of Letters Patent.     Patented Mar. 31, 1914.

No Drawing.     Application filed March 13, 1911. Serial No. 614,054.

*To all whom it may concern:*

Be it known that I, WILLIAM C. ARSEM, a citizen of the United States, residing at Schenectady, county of Schenectady, State of New York, have invented certain new and useful Improvements in Graphite Conductors, of which the following is a specification.

This application is in part a continuation of my prior application, Serial No. 329,284, filed August 6, 1906.

This invention relates to the production of refractory conductors suitable for use as incandescing members in electric lamps, furnaces, and other apparatus.

According to my invention pure graphite is mixed with a suitable binder to produce a plastic mixture which can be squirted or otherwise shaped into threads or filaments. These threads are subsequently treated to carbonize the binder or even to graphitize the binder and thereby produce a filament consisting entirely of graphite. This method of producing a filament entirely of graphite and also the production of graphite from lamp black hereinafter mentioned were disclosed in my prior application above referred to and those portions of the following specification which set forth these matters therefore form a continuation of said prior application.

My invention also involves the production of a superior variety of graphite of high specific gravity and the manufacture of filaments therefrom.

According to the present classification adopted by chemists, the term "graphite" applies to a large and somewhat indefinable class of carbons which are characterized by a similarity of behavior toward certain chemical reagents in forming graphitic oxid, by being unctuous to the touch and having a comparatively low electrical resistance. When, however, the various forms of graphite are applied to the manufacture of incandescent filaments, important differences in their mechanical and electrical properties become at once apparent. In many cases the bulbs are blackened by the disintegration of the filament and dispersion of the graphite particles when the filaments are incandescent, and the resistance of the filament rises during its life, which, with a constant supply voltage, causes a drop in candle-power.

After investigating a large variety of carbonaceous substances, my researches have led me to the conclusion that graphite of the highest attainable specific gravity approaches most nearly the condition of pure sintered graphite and possesses the stability required in a luminant.

By the use of a carbonaceous binder, which will yield by decomposition a residue capable of being itself converted into graphite of high specific gravity, I am enabled to make filaments which are composed entirely of graphite of high specific gravity and which may be operated at high efficiency in an incandescent lamp without involving rapid disintegration of the filament and blackening of the bulb.

When the various modifications of amorphous carbon are fired at high temperature, which may be done according to the process disclosed by W. R. Whitney in Patent No. 916,905, they are converted into graphite of varying degrees of density, and each particular variety of carbon reaches a definite density characteristic of that variety. The specific gravity of the graphite produced by firing certain sources of carbon hereinafter disclosed approaches the value of 2.27, which appears to be close to the maximum value of specific gravity obtainable. This dense form of graphite is highly refractory and non-disintegrating at high incandescence, and filaments made therefrom have a low cold resistance and are subject to little change in their resistance when in use.

As examples of forms of carbon which can be converted into graphite of high specific gravity, I may mention petroleum coke, a form of carbon remaining from the distillation of petroleum residues. When fired at the high temperature attainable in a carbon tube furnace, that is 3000° to 4000° C., petroleum coke is converted into graphite of a specific gravity of 2.26, having an ash content of not more than .1 per cent. White retort carbon, a by-product of coal distillation, under the same conditions is also converted into graphite of a specific gravity of about 2.26+. I may also use the carbon obtainable by coking the carbonizable material which I employ as a binder for making filaments and which I shall hereinafter describe. In accordance with still another method, graphite available for the production of my improved filament is produced by obtaining a deposit of lamp black from volatile hydrocarbons and then heating the lamp black in an electric tube furnace to a temperature of 3000° C., or higher, to expel all gas and volatile hydrocarbons from the lamp black and to convert the carbon into graphite. The product so obtained is exceedingly fine grained and uniform and well suited for use in subsequent steps of my process. In the same way the "coating carbon" or graphite can be used as obtained by bringing gasolene or other carbon-containing vapor into contact with an incandescent surface as in the well-known process of flashing or treating filaments. Graphite produced in other ways may also be used, provided it is substantially free from mineral matter and other objectionable impurities and can be converted into a finely divided state. I realize that the term "graphite" is more or less indefinite, but I have used the term as meaning a substance which yields graphitic oxid when oxidized with nitric acid and potassium chlorate. The pure graphite, after proper grinding and sifting, is mixed with a lubricant yielding a carbonizable residue. I prefer to use for this purpose hard coal tar pitch which has been fractionated as hereinafter described. As alternative forms of binder I may mention first, petroleum pitch, a well-known by-product of the distillation of petroleum, also gluecose, caramel solution, or waxes, or mixtures of these materials.

In carrying out the process above outlined I first produce finely divided graphite free from gas and mineral matter. When using a solid form of carbon, such as petroleum coke, it is first crushed to small fragments and is then ground in a suitable mill to a degree of fineness which will enable it to pass through a bolting cloth of 200 meshes to the linear inch.

One form of mill which I have found very satisfactory is a mill very similar to the well-known ball mill, except that, instead of containing balls as the pulverizing members, the mill contains a number of polished steel cylinders which are free to tumble over each other as the steel cylinder in which they are contained is revolved. Cylinders are preferable to balls as a roll presents a line contact instead of a point contact as is the case with balls. The ground product is then fired, or metallized, in a carbon tube furnace at a temperature somewhat lower than the burning out point of the tube, say 3000° C., whereby it is converted into graphite as already explained. The fired material is then still further ground in a suitable liquid, such as petroleum naphtha or carbon tetrachlorid, in an iron mill of the well known type employed in paint manufacture. The paint mill product is dried by heating.

The particular order of operations for preparing the graphite as here described need not be strictly followed.

The pitch binder is prepared by crushing the same to small fragments and treating with a suitable solvent, such as benzol or carbon tetrachlorid. This will dissolve the soluble portion of the pitch. The relatively insoluble portion, amounting to about 30 per cent., will settle to the bottom, thus enabling the soluble portion to be separated therefrom by filtration. The filtrate is heated gently, so as to remove the solvent, and is finally heated to drive off the volatile oils, present to the amount of about 20 per cent., or until a flow point of about 180° C. is reached. The boiling point at this stage is above 220° C. The binder remaining is suitable for use in the manufacture of filaments. The graphite, finely ground according to one of the above methods, and the binder are now ready for thorough incorporation to form the squirting mixture. As the fineness of the material for making the filament is important in connection with the change of resistance during the life of the filament, I prefer to adopt a mixing method which will introduce a certain amount of grinding as well as mixing. When using a brittle binder, such as coal tar pitch, dry grinding of the carbon and the binder together is a convenient means of carrying out this part of the process.

According to one method, about 45 parts of graphite and 55 parts of binder are thoroughly ground in a roller mill for a period of 50 to 100 hours at about 200 revolutions per minute. When taken from the mill, the mixture so produced is ready to be squirted or otherwise formed into threads or filaments. The squirting mold should be maintained at a temperature of about 225° C. when using a hard binder; at about this temperature the mixture can be squirted with a pressure of 30,000 to 45,000 pounds per square inch. The resulting threads are relatively strong and may be easily wound on forms and otherwise manipulated. I next heat the threads in an ordinary baking oven to a temperature approximating 300°–400° C., preferably at the lower temperature, to carbonize the binder and render the threads or filaments comparatively free from the easily vaporizable components of the binder. Access of air while baking appears to be beneficial rather than harmful. The filaments preferably are then heated in a protecting atmosphere or in a vacuum to a somewhat higher temperature,—say 600° C., to remove the volatile matter still remaining and thoroughly carbonize the binder. At this stage in the operation the threads or filaments consist of pure graphite particles held in place by carbon. Such filaments are conductive and are serviceable as heat and light sources without further treatment. Preferably, however, I heat the filaments to graphitize the carbon left by the binder and thereby produce a homogeneous filament consisting entirely of graphite. To carry out this last step, I pack the filaments to be treated in powdered graphite and fire them in an electric resistance furnace of the tube type, carrying the heat to 3000° or 4000° C., for a sufficient time to completely graphitize all parts of the filament. As an alternative method of graphitizing, I may fire the packed filaments in the vacuum furnace shown in U. S. Patent No. 785,535, of March 21, 1905. Such treatment has the advantage of simultaneously removing air and other gases from the filaments. The resulting uniformly graphitic filament has a low specific resistance, the range of resistance at 20° C. being about .0006–.0010 ohms per centimeter cube, and its specific gravity, of course, is about 2.26 as that of the original material. Filaments of this nature may be mounted without further treatment in incandescent lamps, but preferably are employed as "base" filaments and coated with a layer of carbonaceous material by being flashed or treated in an atmosphere of hydrocarbon vapor by the well-known process now in use. The coating then is likewise converted into graphite of high density in the manner disclosed in U. S. Patent No. 916,905. In this manner I obtain a composite filament, both the base and coating of which consists of graphite.

What I claim as new, and desire to secure by Letters Patent of the United States, is:—

1. The process which consists in mixing graphite with a carbonaceous binder, shaping the mixture so produced to form threads or filaments, heating to carbonize the binder, and subsequently heating at a higher temperature to graphitize the carbon left by the binder and thus convert them into serviceable, refractory filaments consisting wholly of carbonaceous material.

2. The process which consists in mixing graphitic material derived from a hydracarbon with a carbonaceous binder to form a plastic mixture, squirting threads from said mixture, heating the threads to carbonize the binder and render them free from easily vaporizable components, and subsequently heating to a very high temperature to completely graphitize the carbonized residue of the binder.

3. The process which consists in mixing graphite of high density with a binder convertible into graphite of substantially the same density, heating to carbonize the binder, and subsequently heating to a higher temperature to graphitize the carbon left by said binder and produce a refractory filament consisting of homogeneous graphite of high density.

4. The process which consists in mixing graphitized petroleum coke with a fractionated portion of coal tar pitch, shaping the mixture so produced to form filaments, and subsequently treating said threads to convert them into homogeneous conductors of pure graphite.

5. As an article of manufacture, a conductive homogeneous thread consisting of graphite powder, the particles of which are held in position by carbon convertible by heating to graphite of high specific gravity.

6. A homogeneous filament consisting of a graphite base and a graphite coating, both having a density approximating 2.26.

7. A homogeneous filament consisting of graphite having a specific gravity of about 2.26, said filament having a specific resistance of about .0006–.0010 ohms per centimeter cube.

8. A homogeneous filament consisting of graphite having a specific gravity of about 2.26.

9. A homogeneous graphitic filament having a specific resistance at 20 degrees centigrade, not over .001 ohms per centimeter cube.

10. A binder for filament manufacture, consisting of coal tar pitch soluble in benzol and having a boiling point above 220 degrees centigrade.

In witness whereof, I have hereunto set my hand this 11th day of March, 1911.

WILLIAM C. ARSEM.

Witnesses:
BENJAMIN B. HULL,
HELEN ORFORD.